Jan. 17, 1928.  
K. M. HAUGEN  
MAP OR CHART PROTECTOR  
Filed June 25, 1925

1,656,673

Karl M. Haugen  
By Ira M. Jones  
Attorneys

Patented Jan. 17, 1928.

1,656,673

UNITED STATES PATENT OFFICE.

KARL M. HAUGEN, OF APPLETON, WISCONSIN.

MAP OR CHART PROTECTOR.

Application filed June 25, 1925. Serial No. 39,543.

This invention relates to certain new and useful improvements in map or chart protectors and has as an object the provision of an improved transparent envelope in which a map or chart may be carried in such a manner as to facilitate ready reference thereto.

In cross-country flights by aeroplane one of the greatest difficulties is the handling of the map and in many instances it has been tacked to a board within the cock-pit, or has been strapped to the knee of the pilot, or folded so as to permit its being carried in the pocket. This has been very objectionable as it affords no means by which a considerable distance can be referred to on the map and further the map becomes distorted, soiled and blown about by the air. These objections are also true when making long automobile trips and, therefore, this invention has as a further object the provision of an improved container for maps which will keep the map in a flat, clean condition and which will permit easy and convenient reference thereto.

A still further object of this invention resides in the provision of a very simple map or chart receiver which is transparent on both sides to permit reference to either side of the map or chart and which has delineations along one edge to permit calculation of the distance between given points, the receptacle having reinforced edges to maintain the same rigid.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

Figure 1:
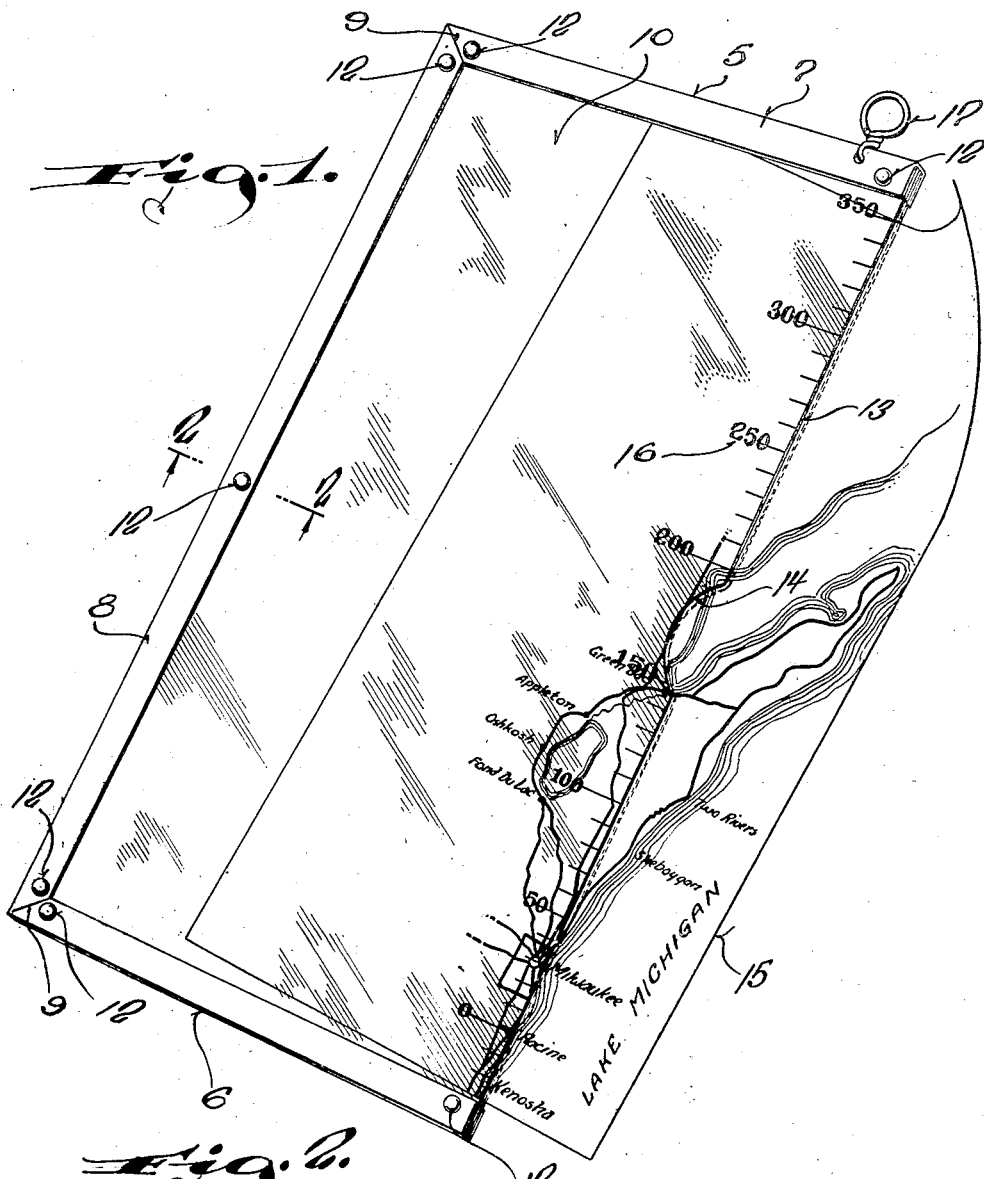
Figure 2:
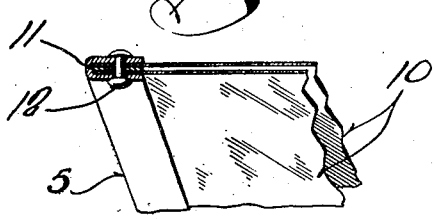

In the accompanying drawing, I have illustrated one complete example of the physical embodiment of my invention constructed according to the best mode I have so far devised for the practical application of the principles thereof, and in which:

Figure 1 is a perspective view of a map or chart container embodying my invention; and Figure 2 is a fragmentary, perspective, sectional view taken through Figure 1 on the plane of the line 2—2.

Referring now more particularly to the accompanying drawing, in which like numerals designate like parts throughout the several views, the numeral 5 designates a rectangular frame comprising ends 6 and 7 and one side 8 preferably formed from a single length of channeled material having its corners formed by cutting a piece out of the sides thereof, as at 9, and then bending the same to a right angle. The frame is preferably formed of light metal such as aluminum, although fibre or any other type of material may be employed.

Secured within the frame are two sheets of transparent material 10 such as celluloid or the like, which are secured in the channel of the frame with its edges held in spaced relation by a spacing member 11, rivets or other fastening means 12 passing through the frame members, the transparent members and the spacers to thus form an envelope.

The outer free ends 13 of the transparent members are preferably notched at a medial point, as at 14, to facilitate the removal from the envelope of a map or chart 15 and the members 10 being maintained in spaced relation by the spacers 11 permit the free sliding therebetween of the map or chart.

The transparent members 10 are provided with delineations 16 along their free edges 13 which represent miles or kilometers so that the distance between any two points may be quickly obtained. If it is desired to accurately obtain the distance between any two points on a map or chart, the same may be partially withdrawn, as illustrated in Figure 1, thus as shown it will be seen that the distance from Milwaukee to Green Bay is approximately 135 miles.

One end of the frame may be provided with a ring or other means 17 to permit its being hung from the automobile dash, or in the cock-pit of an aeroplane, thus being in sight at all times and capable of being handled for closer inspection when necessary.

I claim:

1. A map carrying and reading device of the character described, comprising an envelope including side members connected along three marginal edges and free at their other to permit the insertion of a chart between the members at their free edges, one of the side members being transparent to permit a view of a chart within the envelope, and delineations on the transparent side member adjacent its free edges to facilitate the calculation of distance between points on the chart.

2. A map carrying and reading device of the character described, comprising an envelope including side members connected along three marginal edges and free at their other to permit the insertion of a chart between the members at their free edges, said side members being transparent to permit a view of either side of a chart within the envelope, delineations on the transparent side member adjacent its free edges to facilitate the calculation of distances between points on the chart, and means at the free edges of the side members to facilitate the withdrawal of a chart from the envelope.

In testimony whereof I affix my signature.

KARL M. HAUGEN.